(12) United States Patent
Hauschultz (10) Patent No.: US 11,177,674 B2
(45) Date of Patent: Nov. 16, 2021

(54) COMMUNICATION APPARATUS WITH CHARGING REMINDER, AND METHOD

(71) Applicant: GN Audio A/S, Ballerup (DK)

(72) Inventor: Lars Ivar Hauschultz, Ballerup (DK)

(73) Assignee: GN AUDIO A/S, Ballerup (DK)

( * ) Notice: Subject to any disclaimer, the term of this patent is extended or adjusted under 35 U.S.C. 154(b) by 231 days.

(21) Appl. No.: 16/690,957

(22) Filed: Nov. 21, 2019

(65) Prior Publication Data

US 2020/0185942 A1 Jun. 11, 2020

(30) Foreign Application Priority Data

Dec. 6, 2018 (EP) ..................................... 18210786

(51) Int. Cl.
*H02J 7/00* (2006.01)
*G06F 1/28* (2006.01)

(52) U.S. Cl.
CPC .............. *H02J 7/0047* (2013.01); *G06F 1/28* (2013.01); *H02J 7/00* (2013.01)

(58) Field of Classification Search
USPC ......................................................... 320/107
See application file for complete search history.

(56) References Cited

U.S. PATENT DOCUMENTS

| | | | |
|---|---|---|---|
| 2013/0262891 A1* | 10/2013 | Gudlavenkatasiva | .................... G06F 1/3212 713/320 |
| 2015/0054458 A1* | 2/2015 | Yoon | ........................ H02J 7/025 320/108 |

(Continued)

FOREIGN PATENT DOCUMENTS

| | | |
|---|---|---|
| WO | 2017095965 | 6/2017 |
| WO | 2017211732 | 12/2017 |

OTHER PUBLICATIONS

Extended European Search Report for European patent application No. 18210786.2 dated May 17, 2019.

*Primary Examiner* — Mohammed Alam
(74) *Attorney, Agent, or Firm* — Hamre, Schumann, Mueller & Larson, P.C.

(57) ABSTRACT

A communication apparatus (1), such as a mobile phone, a tablet computer or a laptop computer, provides charging reminders to the user of a connected peripheral device (14), such as a headset. The charging reminders are provided in dependence on an auxiliary status signal (AS) received from the peripheral device (14) and on detected charging events (ME), wherein a main charging event (ME) comprises a charging or replacement of a main battery (2) that energizes the communication apparatus (1). The auxiliary status signal (AS) indicates an auxiliary energy level (AL) of an auxiliary battery (15) of the peripheral device (14). The communication apparatus (1) detects low-battery conditions (LC), based on the indicated auxiliary energy level (AL), and provides notification signals (NS) for a user interface (11) to notify the user of the detected low-battery conditions (LC) in response to the detected main charging events (ME).

The communication apparatus (1) acts to notify the user to conveniently charge or replace the auxiliary battery (15) of the peripheral device (14) together with the main battery (2) and thus prevent that the auxiliary battery (15) becomes discharged in the interval before a subsequent charging or replacement of a main battery (2). The communication apparatus (1) may aid its user in reducing the number of times a peripheral device (14) becomes inoperable due to a discharge of the battery (15).

13 Claims, 2 Drawing Sheets

(56) References Cited

U.S. PATENT DOCUMENTS

| | | | |
|---|---|---|---|
| 2016/0039301 A1* | 2/2016 | Igarashi | B60L 53/60 |
| | | | 320/157 |
| 2017/0033587 A1* | 2/2017 | Hong | H02J 50/80 |
| 2017/0269167 A1* | 9/2017 | Willey | G01R 31/382 |
| 2020/0185942 A1* | 6/2020 | Hauschultz | H02J 7/00 |

* cited by examiner

COMMUNICATION APPARATUS WITH CHARGING REMINDER, AND METHOD

TECHNICAL FIELD

The present invention relates to a communication apparatus with charging reminder and to a method for controlling a communication apparatus, such as a mobile phone, a tablet computer or a laptop computer.

BACKGROUND ART

Prior art devices like mobile phones and computers that comprise rechargeable or replaceable batteries are known to be able to inform a user about estimated remaining battery time, which allows the user to plan charging or replacing of the battery at a time when this is less disturbing. Some devices are further known to inform the user about a battery status of connected audio equipment, such as e.g. headsets or speakerphones. Despite this, many users experience that their headset or other audio equipment needs charging at inconvenient times. This happens more often when the charging interval of the audio equipment is much larger than the charging interval of the mobile phone or computer because the user is then more likely to forget about charging of the audio equipment. The problem is often experienced as more annoying with mobile devices, like mobile phones, tablet computers and laptop computers, since their usability may be limited without connected audio equipment, and since charging of the audio equipment may limit the mobility of the user.

US 2015/0054458 A1 discloses a portable electronic device including a battery and a wireless charging unit configured to receive wirelessly electric power from a wireless power supply device and to charge the battery. The portable electronic device includes a control unit configured to control a short-range wireless communication unit to transmit a message for requesting a wireless charging process for a connected external device to the wireless power supply device.

A checking procedure can include operation of the control unit for checking a charging quantity of the battery, operation of the control unit for controlling the short-range wireless communication unit to transmit a charging status request message to other devices being now under a charging process, and operation of the control unit for receiving a response message containing charging status information from such devices through the short-range wireless communication unit.

The control unit can determine whether a wireless power supply device is connected. The portable electronic device can monitor a battery percentage of respective individual devices including itself and then can inform a user that a certain device requires a charging thereof. A user can, therefore, decide whether to charge that device.

The control unit can receive charging status information through the short-range wireless communication unit and store it in a memory unit.

The disclosed portable electronic device may aid the user in improving efficiency of wireless charging of the portable electronic device and/or peripheral devices that are currently connected to the portable electronic device.

US 2013/0262891 A1 discloses an approach for conserving power of a mobile device based on its pattern of use with respect to one or more tasks. An intelligent power source manager collects consumption information relating to a power source of a mobile device for execution of the one or more tasks. A pattern of use with respect to the one or more tasks based on the collected consumption information is then determined. The intelligent power source manager then selects an action to conserve usage of the power source, according to the pattern of use, in response to subsequent execution of the one or more tasks.

The power source manager may determine an average time period, an average frequency, or a combination thereof of a charge cycle of the battery to set the scheduled time for performance of the one or more tasks. The charge cycle corresponds to a process or duration of time for charging of the user device. The power source manager may determine an average duration of the performance of the one or more tasks, a frequency of the performance of the one or more tasks, an average rate of battery consumption for the one or more tasks, or a combination thereof within the charge cycle. Still further, the power source manager may determine that an average rate of battery consumption for the one or more tasks satisfies a predetermined threshold. The averages may be computed based on the historical consumption information gathered for a duration of time corresponding to a training period. The scheduled time may correspond to a period of minimal activity or charging of the device, as determined as a result of analysis of the consumption information.

WO 2017/095965 A1 discloses a wearable device including one or more processors, a plurality of communication components, one or more motion sensors configured to detect motion of the wearable device and generate, based on the detected motion, motion data, and a storage device configured to store at least one module. The at least one module may be operable by the one or more processors to: responsive to determining that the wearable device is not connected to a computing device using a first communication technology, determine, based on the motion data, whether the wearable device is currently being worn, and responsive to determining that the wearable device is currently being worn, establish a wireless connection to the computing device using a second communication component.

A power management module may determine the estimated amount of operating time remaining based on the current charge level of a power component, a historical power usage of the wearable device, and/or a predicted future power usage of the wearable device. The historical power usage may include the average power usage since the wearable device was last disconnected from a charger, an average power usage for the particular context (e.g., day of the week, location, scheduled calendar events, temperature, current activity, time, average amount of data sent/received, etc.), an average power usage for a particular amount of time (e.g., average daily power usage over the previous thirty days), etc. The predicted future power usage may be based on the average power usage for the particular context and/or predicted future context of the wearable device. The power management module may determine an amount of time each of the communication components are active during the current discharge cycle. Based on the amount of active time of each communication component, the power management module may estimate how much power each communication component has used during the discharge cycle.

There is thus a need for a communication apparatus that can aid a user in planning convenient charging of connectable audio equipment and other peripheral devices.

DISCLOSURE OF INVENTION

It is an object of the present invention to provide an improved communication apparatus, such as e.g. a mobile phone, a tablet computer or a laptop computer, without some disadvantages of prior art apparatuses. It is a further object to provide a method for controlling a communication apparatus with similar advantages.

These and other objects of the invention are achieved by the invention defined in the independent claims and further explained in the following description. Further objects of the invention are achieved by embodiments defined in the dependent claims and in the detailed description of the invention.

Within this document, the singular forms "a", "an", and "the" specify the presence of a respective entity, such as a feature, an operation, an element or a component, but do not preclude the presence or addition of further entities. Likewise, the words "have", "include" and "comprise" specify the presence of respective entities, but do not preclude the presence or addition of further entities. The term "and/or" specifies the presence of one or more of the associated entities. The steps or operations of any method disclosed herein need not be performed in the exact order disclosed, unless expressly stated so. Furthermore, the terms "main" and "auxiliary" are only used to emphasize distinction between features otherwise liable to be confused and do not bear any other meaning.

BRIEF DESCRIPTION OF THE DRAWINGS

The invention will be explained in more detail below together with preferred embodiments and with reference to the drawings in which.

The figures are schematic and simplified for clarity, and they just show details essential to understanding the invention, while other details may be left out. Where practical, like reference numerals and/or names are used for identical or corresponding parts.

MODE(S) FOR CARRYING OUT THE INVENTION

Figure 1:
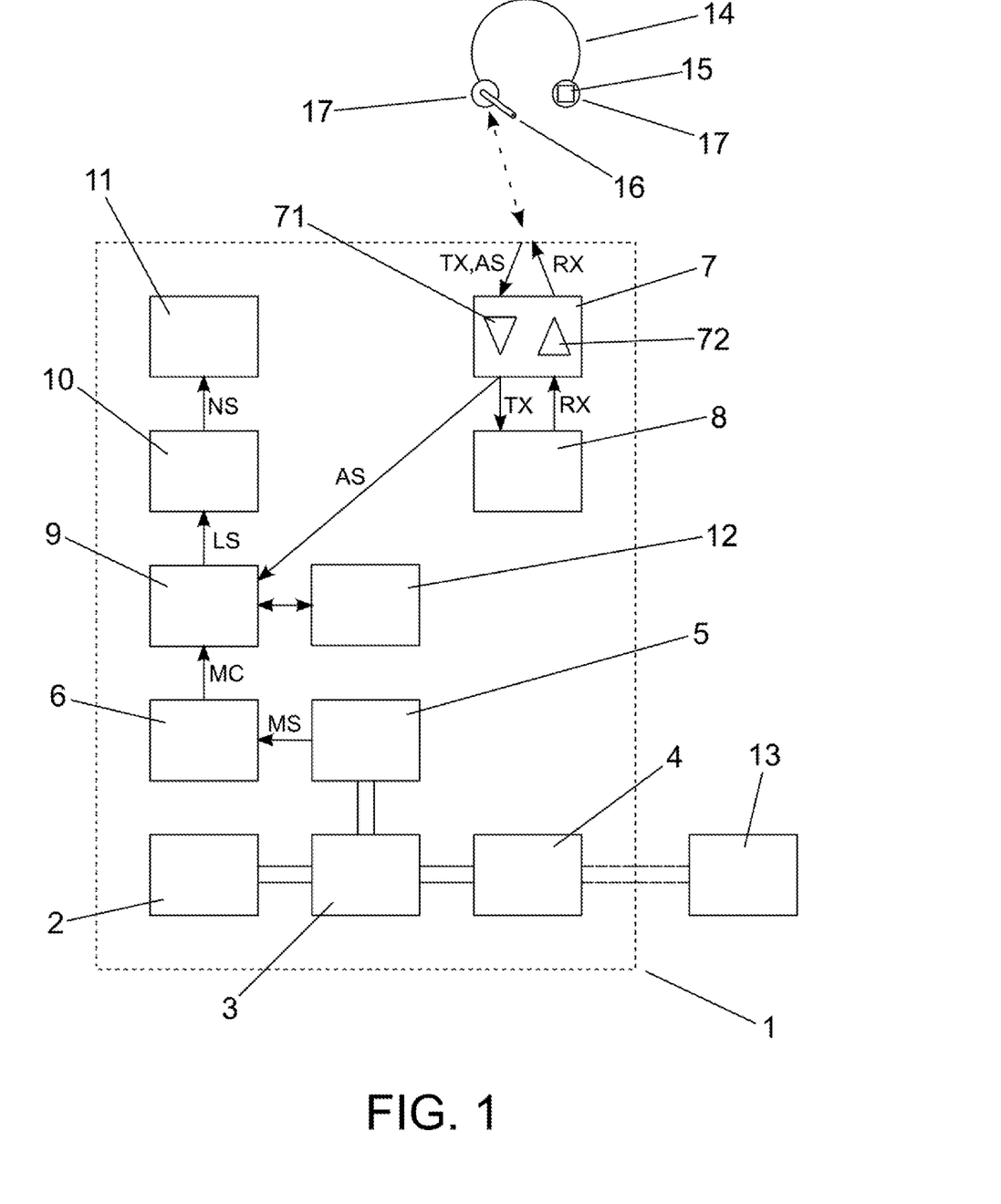
FIG. 1 shows an embodiment of a communication apparatus according to the invention.

The communication apparatus 1 shown in FIG. 1 comprises a main battery 2, a battery interface 3, a charging circuit 4, a battery monitor 5, a charging detector 6, a wireless transceiver 7, a communication circuit 8, an estimator 9, a controller 10, a display 11 and a non-volatile memory 12. The communication apparatus 1 may preferably be configured as a mobile phone, a tablet computer or a laptop computer, but may be configured as other types of communication apparatus that can connect to external devices. The communication apparatus 1 may preferably be configured as a mobile device intended to be used, at least temporarily, without connection to an external energy source 13.

The main battery 2 is rechargeable and may be based on any known technology for rechargeable electric batteries, such as e.g. NiCd cells, NiMH cells, Lithium ion cells, fuel cells, etc. The main battery 2 is connected to the battery interface 3 which receives electrical energy from the main battery 2 to energize the communication apparatus 1. The charging circuit 4 conveys electrical energy received from an external energy source 13 to the battery interface 3 to charge the main battery 2. In some embodiments, the charging circuit 4 may comprise a connector (not shown) for connecting to an external energy source 13 and/or wiring (not shown) for conveying electrical energy from the connector and/or the external energy source 13 to the battery interface 3. In some embodiments, the charging circuit 4 may comprise a power converter (not shown) for limiting or converting the voltage and/or for modifying the waveform of the electrical energy before supplying it to the battery interface 3.

In some embodiments, the battery interface 3 may comprise a receptacle (not shown), e.g. a connector, a compartment or the like, for accommodating the main battery 2 such that it may be replaced by a user of the communication apparatus 1. In such embodiments, the main battery 2 may thus be temporarily absent—e.g. during shipment from a manufacturer to a consumer or during replacement, the main battery 2 may be non-rechargeable and/or the charging circuit 4 may be omitted.

The battery monitor 5 monitors the battery interface 3 to provide a main status signal MS indicating a status of the main battery 2. The battery monitor 5 may determine the status of the main battery 2 to indicate MX (see FIG. 2) when the external energy source 13 is connected to the charging circuit 4 and/or when energy is conveyed from the external energy source 13 to the battery interface 3. The battery monitor 5 may e.g. detect connection of the external energy source 13 by monitoring the state of a switch (not shown) arranged at a connector for the external energy source 13 or by monitoring a voltage of the battery interface 3. The battery monitor 5 may e.g. detect when energy is conveyed from the external energy source 13 to the battery interface 3 by monitoring a current through wiring of the charging circuit 4 or by monitoring a status signal (not shown) from the charging circuit 4.

Alternatively, or additionally, the battery monitor 5 may determine the status of the main battery 2 to indicate a main energy level ML (see FIG. 2) of the main battery 2. The battery monitor 5 may determine the main energy level ML to represent a simple property of the rechargeable battery 2, such as e.g. the battery voltage, or to represent a signal derived from one or more properties of the rechargeable battery 2 that correlate positively with the remaining energy stored in the rechargeable battery 2, e.g. according to any of the many methods known in the prior art for determining energy levels or charge levels (also known as "state-of-charge") of rechargeable batteries. In some embodiments, the main battery 2 may itself provide a state-of-charge signal, and the battery monitor 5 may determine the main energy level ML to represent the state-of-charge signal.

The charging detector 6 receives the main status signal MS and analyses it to detect main charging events ME (see FIG. 2), i.e. charging or replacement of the main battery 2. The charging detector 6 provides a main charging signal MC that indicates the detected main charging events ME. The charging detector 6 may e.g. detect charging of the main battery 2 by analyzing the main status signal MS for indications MX of the external energy source 13 being connected to the charging circuit 4 and/or energy being conveyed from the external energy source 13 to the battery interface 3. Alternatively, or additionally, the charging detector 6 may e.g. detect charging or a replacement of the main battery 2 by analyzing the main status signal MS for increases of the indicated main energy level ML of the main battery 2.

The wireless transceiver 7 comprises a receiver 71 and a transmitter 72. The transceiver 7 is wirelessly connectable to a headset 14. The headset 14 comprises a rechargeable auxiliary battery 15, a microphone 16 and a pair of earphones 17. The headset 14 may e.g. be used by a user to conduct telephone conversations with remote parties through the communication apparatus 1. The headset 14 transmits an audio input signal TX derived from input sound picked up by the microphone 16 and an auxiliary status signal AS that indicates an auxiliary energy level AL (see FIG. 2) of the rechargeable auxiliary battery 15. The receiver 71 receives the audio input signal TX and passes it on to the communication circuit 8. The receiver 71 further receives the auxiliary status signal AS and passes it on to the estimator 9. The communication circuit 8 transmits an outgoing communication signal (not shown) based on the audio input signal TX to the remote party. The communication circuit 8 receives an ingoing communication signal (not shown) from the remote party and provides an audio output signal RX based thereon. The transmitter 72 transmits the audio output signal RX to the headset 14. The headset 14 receives the audio output signal RX and provides a corresponding output sound through the earphones 17.

The headset 14 is an example of a peripheral device that may be connected to the transceiver 7 and may thus be used for interacting with the communication apparatus 1. The transceiver 7 may be wirelessly connectable to other types of peripheral audio devices 14, such as e.g. headphones, hearing aids, microphones, loudspeakers or speakerphones. The transceiver 7 may be wirelessly connectable to peripheral devices 14 that do not communicate audio signals TX, RX, such as e.g. computer mice or keyboards. The transmitter 72 and/or the provision of the audio output signal RX may be omitted in embodiments of the communication apparatus 1 that are intended for unidirectional connection to peripheral devices 14 that do not or cannot receive signals, such as audio signals, from the communication apparatus 1. Reception of the audio input signal TX may be omitted in embodiments of the communication apparatus 1 that are intended for connection to peripheral devices 14 that do not or cannot transmit audio signals TX to the communication apparatus 1. In some embodiments, the wireless connection may be replaced entirely or partly with a wired connection. In such embodiments, the receiver 71 and/or the transmitter 72 may be configured solely for wired reception or transmission. A peripheral device 14 may thus generally be connected or connectable to the communication apparatus 1 through a wireless and/or a wired connection.

The estimator 9 receives the auxiliary status signal AS and the main charging signal MC. The estimator 9 detects low-battery conditions LC (see FIG. 2), based at least on the auxiliary energy level AL indicated by the auxiliary status signal AS, and provides a low-battery signal LS indicating the detected low-battery conditions LC. The estimator 9 determines notification triggers NT (see FIG. 2), in response to the main charging events ME indicated by the main charging signal MC and in dependence on the detected low-battery conditions LC, and provides an indication by the low-battery signal LS of the determined notification triggers NT.

In the present context, a low-battery condition LC is defined as a detected temporary occurrence of conditions that make it likely that the peripheral device 14 will become inoperable due to a discharge of the auxiliary battery 15 before the first (or in some cases the second) future charging or replacement ME of the main battery 2. Correspondingly, a low-battery condition LC is defined to be present from the first time the estimator 9 detects the presence of said conditions until the first time the estimator 9 detects the absence of said conditions. The estimator 9 repeatedly determines whether a low-battery condition LC is present or absent, and the presence of a low-battery condition LC thus indicates that the estimator 9 has estimated that the user may likely benefit from charging or replacing the auxiliary battery 15 at the first future charging or replacement ME of the main battery 2. As described further below, the estimator 9 may detect low-battery conditions LC in various ways.

The controller 10 receives the low-battery signal LS and in response to an indication by the low-battery signal LS of a notification trigger NT, provides a notification signal NS to the display 11 to notify a user of the corresponding low-battery condition LC. The controller 10 may e.g. provide the notification signal NS to indicate the received notification triggers NT. The notification by the display 11 is intended to prompt the user to charge or replace the auxiliary battery 15 at the same time as charging or replacing the main battery 2, and the display 11 may show a corresponding text message. The communication apparatus 1 may thus aid its user in reducing the number of times a peripheral device 14 becomes inoperable due to a discharge of the auxiliary battery 15. The controller 10 may be configured to also receive user input through a user interface 11, such as e.g. a touch-sensitive display 11.

The charging circuit 4, the battery monitor 5, the charging detector 6, the estimator 9 and/or the controller 10 are preferably configured such that indication of notification triggers NT takes place at such times when a user is likely to be close to the communication apparatus 1, such as when the communication apparatus 1 detects that charging of the main battery 2 begins, ends, or has begun and has not ended—or when power is first supplied to the communication apparatus 1 after a detected charging or a replacement of the main battery 2.

In some embodiments, the display 11 may be replaced or accompanied by one or more other user interfaces of various types, such as e.g. further displays, indicator lights, beepers, loudspeakers, or the like, and the notification to the user may be provided in a suitable format by one or more such user interfaces 11, e.g. in the form of icons appearing or changing on a display, flashing of indicator lights, sound signals or spoken messages. In some embodiments, the notification to the user may be provided by a user interface 11 external to the communication apparatus 1, such as e.g. an earphone 17 of the headset 14 or e.g. an indicator light comprised by a peripheral device 14 of any type. In such embodiments, the display 11 may be omitted, and the controller 10 may provide the notification signal NS for an external user interface through a suitable wired or wireless connection (not shown). In some embodiments, the transmitter 72 may transmit the notification signal NS to the external user interface. Alternatively, or additionally, the communication apparatus 1 may comprise a connector (not shown) and/or a further wireless transmitter (not shown) for connecting an external user interface, and the controller 10 may provide the notification signal NS for an external user interface through that connector or further wireless transmitter.

The non-volatile memory 12 is intended for storing data that need to be retained also when the communication apparatus 1 is powered off. Further below, examples of such storing of data in the non-volatile memory 12 are described. The non-volatile memory 12 may be based on any known memory technology suitable for retaining data long enough to fulfill the intended purpose of data storing. In embodiments not relying on retaining data during power-off, the non-volatile memory 12 may be omitted.

Figure 2:
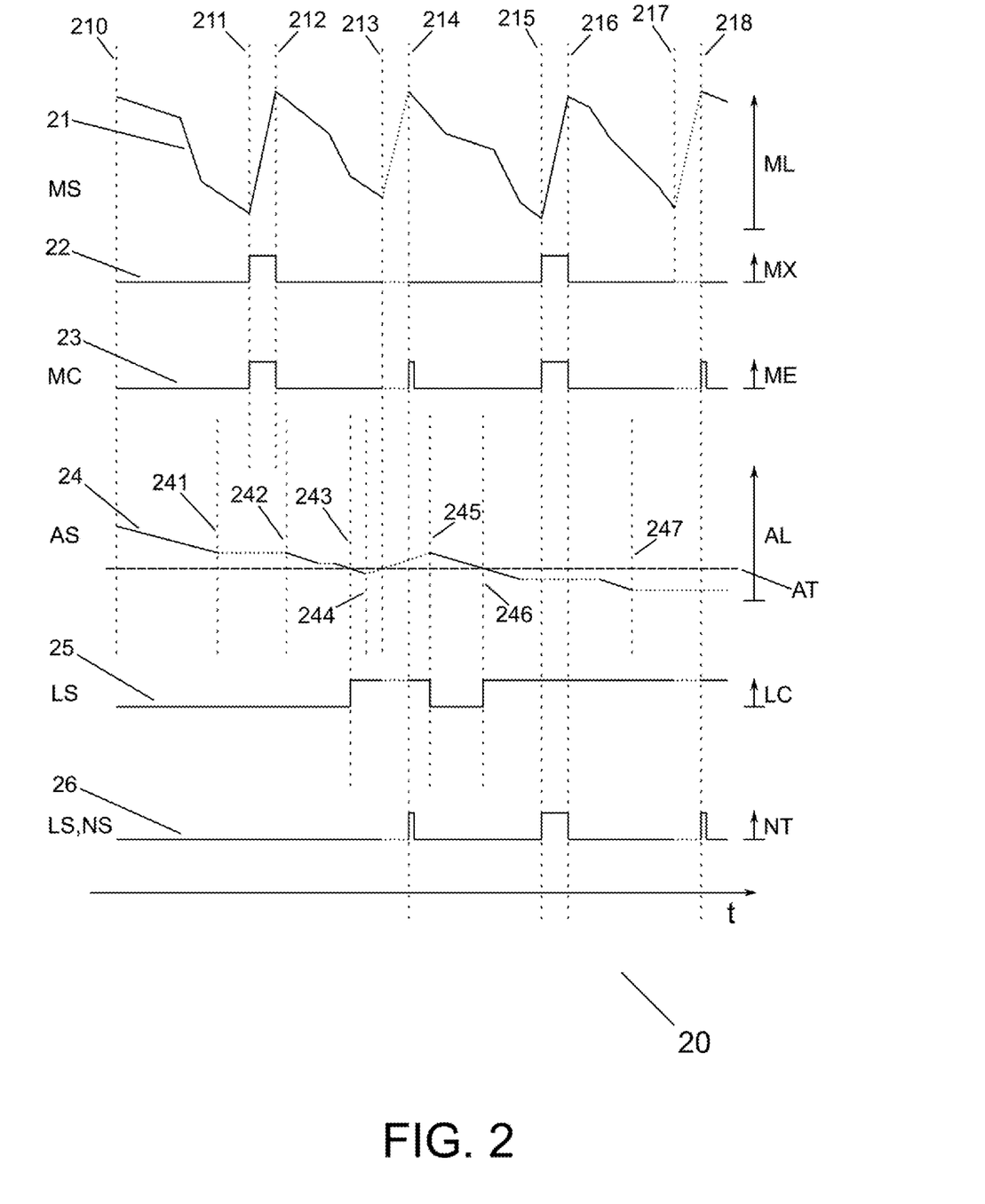
FIG. 2 shows a timing diagram illustrating the functioning of an embodiment of a communication apparatus according to the invention.

FIG. 2 shows a timing diagram 20 that illustrates the functioning of an embodiment of the communication apparatus 1. The timing diagram 20 illustrates an example use over a couple of days of a communication apparatus 1 configured as a mobile phone together with a peripheral device 14 configured as a headset. Note, however, that the illustrated functioning and/or the apparatus features mentioned below may alternatively be implemented in a communication apparatus 1 of other type and/or in combination with peripheral device(s) 14 of other type.

The timing diagram 20 shows an example progress over time t of the main status signal MS, the main charging signal MC, the auxiliary status signal AS, the low-battery signal LS and the notification signal NS with time t progressing rightwards. The curve 21 shows progress of the main energy level ML indicated by the main status signal MS provided by the battery monitor 5. The curve 22 shows timing of indications MX by the main status signal MS of an external energy source 13 being connected to the charging circuit 4 and/or energy being conveyed from an external energy source 13 to the battery interface 3. The curve 23 shows timing of main charging events ME indicated by the main charging signal MC provided by the charging detector 6. The curve 24 shows progress of the auxiliary energy level AL indicated by the auxiliary status signal AS received by the wireless transceiver 7 from the headset 14. The curve 25 shows low-battery conditions LC indicated by the low-battery signal LS provided by the estimator 9. The curve 26 shows timing of notification triggers NT indicated by the low-battery signal LS provided by the estimator 9 and by the notification signal NS provided by the controller 10—and thus indirectly shows the timing of notifications to the user provided by the display 11.

At time 210, the user powers on the mobile phone 1 with a fully charged main battery 2 connected to the battery interface 3 as indicated by the main status signal MS. Correspondingly, the main energy level ML indicates a high energy level. The mobile phone 1 stays on and the main energy level ML decreases over a half day to a low energy level at time 211, when the user connects an external energy source 13 to the charging circuit 4. From time 211 to time 212, the external energy source 13 supplies electric energy to the charging circuit 4 that conveys the electric energy to the main battery 2, which thereby regains charge. The main energy level ML thus increases until time 212, when the user disconnects the external energy source 13. The main energy level ML then decreases over the remaining half day to a low energy level at time 213, when the user powers off the mobile phone 1. In the curves 21, 22, 23, 25 and 26, solid segments indicate that the mobile phone 1 is powered on, while dotted segments indicate that it is powered off. The user charges the main battery 2 during the night and, at time 214 in the morning, powers on the mobile phone 1. The pattern from the day before repeats: The main energy level ML decreases over half the day to a low energy level at time 215, when the user reconnects the external energy source 13 to charge the main battery 2. The main energy level ML increases until time 216, when the user disconnects the external energy source 13. The main energy level ML decreases over the remaining half day to a low energy level at time 217, when the user again powers off the mobile phone 1. The following morning at time 218, the user powers on the mobile phone 1 with a fully charged main battery 2, and the main energy level ML indicates a high energy level.

In the time period from time 211 to time 212 and in the time period from time 215 to time 216, the charging circuit 4 detects that electric energy is supplied from an external energy source 13 and signals this to the battery monitor 5. In response, the battery monitor 5 provides corresponding indications MX by the main status signal MS at time 211 and at time 215. The charging detector 6 detects the indications MX and provides corresponding indications by the main charging signal MC of main charging events ME at time 211 and at time 215. The charging detector 6 analyses the main energy level ML and detects increases of the main energy level ML between time 213 and time 214 as well as between time 217 and time 218. In response, the charging detector 6 provides corresponding indications by the main charging signal MC of main charging events ME at time 214 and at time 218.

As indicated by the auxiliary status signal AS, the user connects the headset 14 to the mobile phone 1 when the latter is powered on at time 210. At this time, the headset 14 has already been used for a couple of days without charging, and the auxiliary energy level AL thus indicates a medium energy level. The user uses the headset 14 during a first period from time 210 until time 241 when the user disconnects it. The user reconnects the headset 14 at time 242. For the remainder of the time frame shown, the user has the headset 14 connected during further periods of use separated by periods of non-use wherein the headset 14 is disconnected. In the curve 24, solid segments indicate that the headset 14 is connected to the mobile phone 1, while dotted segments indicate that it is disconnected. During the periods of use, the auxiliary energy level AL decreases with varying slope due to variations in the use of the headset 14. At time 243, the auxiliary energy level AL decreases below a level threshold AT. At time 244, the user disconnects the headset 14 while the auxiliary energy level AL is below the level threshold AT. In the morning, the user charges the headset 14 for a short time, so that at time 245, when the user reconnects the headset 14, the auxiliary energy level AL is above the level threshold AT. At time 246, the auxiliary energy level AL again decreases below the level threshold AT where it stays for the remaining time. At time 247, the user disconnects the headset 14 for the last time in the time frame shown.

As described in the following, the communication apparatus 1, and particularly the estimator 9, may operate according to various estimation methods for detecting low-battery conditions LC and for determining the notification triggers NT, and such estimation methods may be implemented alone or in any combination in the communication apparatus 1. When operating according to a first estimation method, the estimator 9 repeatedly compares the auxiliary energy level AL with the level threshold AT and detects low-battery conditions LC based on the comparison result. The estimator 9 may e.g. determine the presence of a low-battery condition LC when the auxiliary energy level AL is below the level threshold AT. In the example shown in FIG. 2, the estimator 9 thus determines that a low-battery condition LC is present during the time interval from time 243 when it first detects an auxiliary energy level AL below the level threshold AT to time 245 when it subsequently first detects an auxiliary energy level AL above the level threshold AT. Similarly, the estimator 9 further determines that a low-battery condition LC is present during the time interval from time 246 to at least the end of the time frame shown. The estimator 9 may apply a margin or a hysteresis in the determination. The estimator 9 analyses the main charging signal MC and provides an indication by the low-battery signal LS of a notification trigger NT when the main charging signal MC indicates a main charging event ME during the presence of a low-battery condition LC. The estimator 9 thus indicates a notification trigger NT at time 214, at time 215 and at time 218.

Correspondingly, the controller 10 that receives the low-battery signal LS, indicates a notification trigger NT for the display 11 to notify the user at time 214, at time 215 and at time 218.

The estimator 9 maintains battery data indicating the latest auxiliary energy level AL received from the peripheral device 14 and/or the latest determined presence or absence of a low-battery condition LC for the peripheral device 14. The estimator 9 determines the presence or absence of a low-battery condition LC, based on the battery data, such as on the latest auxiliary energy level AL and/or the latest determined presence or absence of a low-battery condition LC indicated by the battery data, e.g. when the peripheral device 14 is disconnected, such as e.g. between time 244 and time 245 or e.g. after time 247. This enables the notification of the user when a peripheral device 14 is not connected, such as at time 214, at time 215 and at time 218. The estimator 9 may preferably repeatedly write or update the battery data to the non-volatile memory 12 and later determine the presence or absence of a low-battery condition LC, based on the latest auxiliary energy level AL and/or the latest determined presence or absence of a low-battery condition LC indicated by the battery data in the non-volatile memory 12, e.g. when the peripheral device 14 has not been connected since the latest power-on of the communication apparatus 1, such as within the time period between time 214 and time 245. This may enable the notification of the user immediately after power-on of the communication apparatus 1, such as at time 214 and at time 218.

Preferably, the estimator 9 may determine the level threshold AT, based on threshold data in the non-volatile memory 12. The estimator 9 may write the threshold data to the non-volatile memory 12 in response to receiving user input through the controller 10, e.g. indicating a desired value or adjustment of the level threshold AT. This may enable a user to set a threshold level AT for a peripheral device 14. The user may e.g. specify that the level threshold AT be set at a relative level, such as at e.g. 10 or 20 percent of the maximum auxiliary energy level AL of the auxiliary battery 15, that it be set at a specified absolute auxiliary energy level AL and/or that it be incremented or decremented by a specified or default amount. Alternatively, or additionally, the level threshold AT and/or the threshold data may be defined at development and/or written to the non-volatile memory 12 at manufacturing of the communication apparatus 1. Alternatively, or additionally, the level threshold AT and/or the threshold data may be determined by the estimator 9 as described further below.

In some embodiments, the estimator 9 analyses the auxiliary status signal AS to detect auxiliary charging events, i.e. charging or replacement of the auxiliary battery 15 of the peripheral device 14. The estimator 9 may e.g. detect charging of the auxiliary battery 15 by analyzing the auxiliary status signal AS for increases of the indicated auxiliary energy level AL of the auxiliary battery 15. In the example shown in FIG. 2, the estimator 9 may thus detect that an auxiliary charging event has occurred in the interval between time 244 and time 245. The estimator 9 may preferably detect low-battery conditions LC, based on the detected auxiliary charging events.

When operating according to a second estimation method, the estimator 9 counts main charging events to determine a main event count indicating the number of main charging events ME detected since the latest detected auxiliary charging event. The estimator 9 compares the main event count with an event limit and determines the presence or absence of a low-battery condition LC based on the comparison. The estimator 9 may e.g. determine a low-battery condition LC to be present when the main event count approaches, equals and/or exceeds the event limit. The estimator 9 may apply a margin or a hysteresis in the determination. The estimator 9 may update the main event count when the main charging signal MC indicates a main charging event ME and immediately provide a notification trigger NT if the updated main event count causes the detection of a low-battery condition LC. The estimator 9 may preferably repeatedly write or update event data indicating the latest main event count to the non-volatile memory 12 and later determine the main event count, based on event data in the non-volatile memory 12, e.g. when the communication apparatus is powered on. Preferably, the estimator 9 may further determine the event limit, based on limit data in the non-volatile memory 12. The estimator 9 may write the limit data to the non-volatile memory 12 in response to receiving user input through the controller 10, e.g. indicating a desired value or adjustment of the event limit. This may enable a user to set an event limit for a peripheral device 14. The user may e.g. specify that the event limit be set at an absolute number, like e.g. 5, and/or that it be incremented or decremented, e.g. by 1. Alternatively, or additionally, the event limit and/or the limit data may be defined at development and/or written to the non-volatile memory 12 at manufacturing of the communication apparatus 1. Alternatively, or additionally, the event limit and/or the limit data may be determined by the estimator 9 as described further below.

In some embodiments, the estimator 9 analyses the main charging signal MS to determine a main statistic measure, based on a series of indicated main charging events ME and/or on the indicated main energy level ML. Similarly, the estimator 9 may analyse the auxiliary status signal AS to determine an auxiliary statistic measure, based on the indicated auxiliary energy level AL. The estimator 9 may detect low-battery conditions LC, based on the main statistic measure and/or the auxiliary statistic measure. The estimator 9 may preferably maintain statistic data indicating the latest main statistic measure, the latest auxiliary statistic measure and/or the historic values from which the latest main statistic measure and/or the latest auxiliary statistic measure were and/or can be derived. The estimator 9 may preferably repeatedly write or update the statistic data to the non-volatile memory 12 and later determine the main statistic measure and/or the auxiliary statistic measure, based on statistic data in the non-volatile memory 12, e.g. when the communication apparatus is powered on.

In some embodiments, the estimator 9 determines the main statistic measure to indicate an averaged frequency of main charging events ME, and determines the auxiliary statistic measure to indicate an averaged frequency of auxiliary charging events. The estimator 9 determines a charging-event ratio indicating a ratio of the averaged frequency of main charging events ME over the averaged frequency of auxiliary charging events. In other words, the estimator 9 determines how often a main charging event ME occurs compared to how often an auxiliary charging event occurs. The estimator 9 may preferably determine the event limit and/or the limit data for the second estimation method described above, based on the determined charging-event ratio. If for instance, the estimator 9 determines the charging-event ratio to be 11, then the estimator 9 may determine the event limit to be equal to that number or preferably slightly lower than that number, such as e.g. 10 or 9. The estimator 9 may preferably determine the averaged frequency of main charging events ME as a moving average. Similarly, the estimator 9 may determine the averaged frequency of auxiliary charging events as a moving average. This enables the communication apparatus 1 to adapt the provision of notifications for the user to changing user behavior or to e.g. ageing of batteries.

In some embodiments, the estimator 9 determines an auxiliary charging time indicating a predicted time of the first future occurrence of a discharge of the peripheral device 14. In other words, the estimator 9 predicts when the peripheral device 14 for the first time in the future would become inoperable due to discharging of the auxiliary battery 15 if the auxiliary battery 16 were not charged or replaced in the meantime. The auxiliary charging time thus also indicates a predicted time in the future before which the user should charge or replace the auxiliary battery 15 to avoid inoperability of the peripheral device 14. The estimator 9 may determine the auxiliary charging time, based on the auxiliary status signal AS, and may further detect low-battery conditions LC, based on the auxiliary charging time. In some embodiments, the estimator 9 determines the auxiliary charging time based on a statistic evaluation of the auxiliary energy level AL, such as on the auxiliary statistic measure. The estimator 9 may e.g. determine the auxiliary charging time according to any of the many methods known in the prior art for predicting or estimating remaining operation time of a battery-powered device 14, based on information about current and/or historic energy levels AL of its battery 15, such as e.g. the method disclosed in the published International Patent Application WO 2017/211732 A1.

When operating according to a third estimation method, the estimator 9 repeatedly compares the auxiliary charging time to a time limit and determines the presence or absence of a low-battery condition LC, based on the comparison. The estimator 9 may e.g. determine the presence of a low-battery condition when the auxiliary charging time is before the time limit. The estimator 9 may apply a margin or a hysteresis in the determination. The estimator 9 analyses the main charging signal MC and provides a notification trigger NT when the main charging signal MC indicates a main charging event ME during the presence of a low-battery condition LC.

The estimator 9 may preferably repeatedly write or update time data indicating the latest auxiliary charging time to the non-volatile memory 12 and later determine the auxiliary charging time, based on time data in the non-volatile memory 12, e.g. when the communication apparatus is powered on. Preferably, the estimator 9 may determine the time limit, based on the current time and a time duration, e.g. as a sum of the current time and the time duration. Preferably, the estimator 9 may determine the time duration, based on duration data in the non-volatile memory 12. The estimator 9 may write the duration data to the non-volatile memory 12 in response to receiving user input through the controller 10, e.g. indicating a desired value or adjustment of the time duration. This may enable a user to set a time duration for a peripheral device 14. The user may e.g. specify that the time duration be set at an absolute duration, like e.g. 24 hours, and/or that it be incremented or decremented, e.g. by 6 hours. Alternatively, or additionally, the time duration and/or the duration data may be defined at development and/or written to the non-volatile memory 12 at manufacturing of the communication apparatus 1. Alternatively, or additionally, the time limit, the time duration and/or the duration data may be determined by the estimator 9 as described further below.

In some embodiments, the estimator 9 determines a first main charging time indicating a predicted time of the first future occurrence of a main charging event ME. In some embodiments, the estimator 9 may alternatively or additionally determine a second main charging time indicating a predicted time of the second future occurrence of a main charging event ME. In the present context, the first future occurrence of a main charging event ME is defined as the first occurrence of a main charging event ME after the current time. If a main charging event ME is currently in progress, i.e. if the main battery 2 is currently being charged or replaced, then the first future occurrence of a main charging event ME is defined as the first occurrence of a main charging event ME after the main charging event ME currently in progress. Correspondingly, the second future occurrence of a main charging event ME is defined as the first occurrence of a main charging event ME after the first future occurrence of a main charging event ME.

In some embodiments, the estimator 9 determines the time limit, the time duration and/or the duration data for the third estimation method described above, based on the first main charging time. The estimator 9 may e.g. determine that a main charging event ME is currently in progress and, in response thereto, determine the time limit, the time duration and/or the duration data such that the time limit has a predefined relation to the first main charging time; the time limit may e.g. equal the first main charging time. The estimator 9 may apply a margin or a hysteresis in the determination. The margin may e.g. cause the time limit to precede the first main charging time by a few days or a few hours. When a main charging event ME is currently in progress, the estimator 9 may thus determine the presence of a low-battery condition LC e.g. when the predicted time of the first future occurrence of a discharge of the peripheral device 14 is before the predicted time of the first future occurrence of a main charging event ME. The estimator 9 may thus wait for a main charging event ME and then estimate whether the peripheral device 14 will become discharged in the interval before the next one, i.e. before the first future occurrence of a main charging event ME. In the positive case, the estimator 9 preferably immediately indicates a notification trigger NT to enable the user to conveniently charge or replace the auxiliary battery 15 together with the main battery 2 and thus prevent that the auxiliary battery 15 becomes discharged in the interval.

In some embodiments, the estimator 9 alternatively or additionally determines the time limit, the time duration and/or the duration data for the third estimation method described above, based on the second main charging time. The estimator 9 may e.g. determine that a main charging event ME is currently not in progress and, in response thereto, determine the time limit, the time duration and/or the duration data such that the time limit has a predefined relation to the second main charging time; the time limit may e.g. equal the second main charging time. The estimator 9 may apply a margin or a hysteresis in the determination. The margin may e.g. cause the time limit to precede the second main charging time by a few days or a few hours. When a main charging event ME is not currently in progress, the estimator 9 may thus determine the presence of a low-battery condition LC e.g. when the predicted time of the first future occurrence of a discharge of the peripheral device 14 is before the predicted time of the second future occurrence of a main charging event ME. The estimator 9 may thus, in the interval between two main charging events ME, estimate whether the peripheral device 14 will become discharged before the end of the next interval, i.e. before the second future occurrence of a main charging event ME. In the positive case, the estimator 9 preferably indicates a notification trigger NT at the first future occurrence of a main charging event ME to enable the user to conveniently charge or replace the auxiliary battery 15 together with the main battery 2 and thus prevent that the auxiliary battery 15 becomes discharged in the interval.

The estimator 9 may thus detect low-battery conditions LC, based on comparison of the first main charging time and/or the second main charging time with the auxiliary charging time.

The estimator 9 may determine the first and/or the second main charging time, based on the main status signal MS, such as on the main energy level ML and/or the main charging events ME indicated by the main status signal MS. The estimator 9 may preferably determine the first and/or the second main charging time, based on the main statistic measure. The estimator 9 may determine the first and/or the second main charging time according to any of the many methods known in the prior art for predicting or estimating future progression of time-dependent values, based on historic values and/or predicting or estimating future occurrences of events, based on information about timing of historic events.

The estimator 9 may determine the first main charging time, based on the main statistic measure. The estimator 9 may e.g. determine the main statistic measure to indicate a high percentile, such as e.g. the 70th, the 80th, the 90th or the 95th percentile, of an observed distribution of the duration of time intervals between consecutive main charging events ME. The estimator 9 may determine the high percentile based on a moving time window to enable adaptation to changing user behavior and to e.g. ageing of batteries. The estimator 9 may determine the first main charging time to e.g. equal the determined high percentile. If substantial time has passed since the latest main charging event ME, then the estimator may preferably subtract the passed time from the high percentile to determine the first main charging time. Similarly, the estimator 9 may determine the second main charging time based on the determined high percentile. The estimator 9 may determine the second main charging time to e.g. equal a sum of the first main charging time and the determined high percentile. The estimator 9 may alternatively determine the second main charging time to equal two times the determined high percentile. If substantial time has passed since the latest main charging event ME, then the estimator may preferably subtract the passed time when determining the second main charging time. The estimator 9 may apply a margin or a hysteresis in the determination of the first and/or the second main charging time.

The estimator 9 may modify the level threshold AT, the event limit, the time limit, the time duration and/or applied margins or hysteresis spans for a peripheral device 14 dependent on various conditions. The actual values and/or corresponding data in the non-volatile memory 12, may be modified depending on e.g. the time of day, the week day, an operation mode of the communication apparatus 1 selected by the user through a user interface 10.

In some embodiments, the estimator 9 may further to the notification trigger NT provide a warning trigger to the controller 10, in response to detecting the presence of a low-battery condition LC and in dependence on determining that a main charging event ME is currently not in progress. Correspondingly, the controller 10 may provide a warning signal for the display 11 to make the user earlier aware of the need for charging or replacing the auxiliary battery 15 before the second next charging or replacing of the main battery 2.

In some embodiments, the estimator 9 may comprise an artificial neural network or another type of predictive analyser (not shown) adapted to determine e.g. the level threshold AT, the event limit, the time limit, the time duration, applied margins or hysteresis spans, the main statistic measure, the auxiliary statistic measure and/or the presence or absence of a low-battery condition LC, using predictive analytics based on analysis of the detected status of the main battery 2 and the auxiliary energy level AL.

The predictive analyser may receive the auxiliary status signal AS and the main status signal MS, and/or signals derived therefrom, such as the main charging signal MC, the low-battery signal LS and/or the notification signal NS, and may be trained by the estimator 9, based e.g. on when the user chooses to charge or replace the auxiliary battery 15. If, for instance, the auxiliary energy level AL indicates that the user charges or replaces the auxiliary battery 15 in the interval between two main charging events ME, then the estimator 9 may influence the predictive analyser to modify its prediction base to cause the controller 10 to provide the notification signal NS earlier. If, on the other hand, the auxiliary energy level AL indicates that the user has not charged or replaced the auxiliary battery 15 since a provided notification signal NS at the second latest main charging event ME, then the estimator 9 may influence the predictive analyser to modify its prediction base to cause the controller 10 to provide the notification signal NS later. In the present context, the prediction base is defined as the difference between the trained predictive analyser and the same predictive analyser in an earlier untrained state.

The estimator 9 may preferably maintain prediction data indicating the current prediction base of the predictive analyser. The estimator 9 may write the prediction data to the non-volatile memory 12 e.g. in response to a change in the prediction base and/or prior to power-down of the communication apparatus 1, and later determine the prediction base of the predictive analyser, based on prediction data in the non-volatile memory 12, e.g. when the communication apparatus is powered on.

The communication apparatus 1 may be configured to be used with multiple peripheral devices 14, and the receiver 71 may thus be configured to distinguish between such peripheral devices 14, e.g. based on identification codes received from connected peripheral devices 14. The receiver 71 may preferably provide a device identifier uniquely, or likely uniquely, identifying a connected peripheral device 14 to the estimator 9. The estimator 9 may maintain a device list in the non-volatile memory 12 indicating one or more known device identifiers. The estimator 9 may modify the device list in response to detecting the connection of a peripheral devices 14 with an identifier that is not in the device list. Alternatively, or additionally, the estimator 9 may modify the device list in response to receiving user input through the controller 10, e.g. indicating a desired addition to the device list of a connected peripheral device 14 or a desired removal from the device list of a listed peripheral device 14. This may enable a user to specify for which peripheral devices 14 notifications of low-battery conditions LC shall be provided.

The estimator 9 may preferably determine the presence or absence of a low-battery condition LC, based on a device identifier received from the receiver 71. In some embodiments, the estimator 9 may suppress detection of low-battery conditions LC and/or suppress provision of notification triggers NT for peripheral devices 14 not identified by a device identifier indicated by the device list. The device list may be designed to comprise any number of entries, such as e.g. one, two, three or more entries.

The estimator 9 may preferably maintain multiple peripheral data sets in the non-volatile memory 12, such that each peripheral data set is uniquely associated with a device identifier indicated by the device list. Each peripheral data set may comprise device data for a specific peripheral device 14. In the present context, the term "device data" means battery data, threshold data, event data, limit data, time data, duration data, statistic data and/or prediction data as defined further above. Obviously, the type of device data available in a specific implementation of the communication apparatus 1 depends on the implemented estimation method(s).

The estimator 9 may select a peripheral data set, such that the device identifier associated with the selected peripheral data set matches the received device identifier for a connected peripheral device 14, and write device data, such as battery data, event data, time data, statistic data and/or prediction data, for a connected peripheral device 14 to the non-volatile memory 12 by writing the corresponding device data to the selected peripheral data set. This may enable the communication apparatus 1 to monitor the status of multiple peripheral devices 14.

The estimator 9 may select a peripheral data set, such that the device identifier associated with the selected peripheral data set matches a specified device identifier, and write device data, such as threshold data, limit data and duration data, for a peripheral device 14 identified by the specified device identifier to the non-volatile memory 12 by writing the device data to the selected peripheral data set. The specified device identifier may be equal to the received device identifier for a connected peripheral device 14, or it may be specified in user input received through the controller 10. This may enable a user to set e.g. a different threshold level AT, a different event limit and/or a different time duration for each of multiple peripheral devices 14.

The estimator 9 may traverse peripheral data sets associated with device identifiers in the device list and for each visited peripheral data set, determine the presence or absence of a low-battery condition LC for the peripheral device 14 identified by the respectively associated device identifier, based on device data comprised by the visited peripheral data set. In this case, and when indicating the presence of a low-battery condition LC by the low-battery signal LS, the estimator 9 may preferably further provide by the low-battery signal LS an indication of the identity of the peripheral device 14 to which the indicated low-battery condition LC pertains. Correspondingly, the controller 10 may include in the notification signal NS for the display 11 an identification of the respective peripheral device 14 to which a notified low-battery condition LC pertains. This may enable the communication apparatus 1 to correctly notify a user of low-battery conditions LC for a specific peripheral device 14, even when the user uses multiple peripheral devices 14 intermittently or in interleaved sequence.

The charging circuit 4, the battery monitor 5, the charging detector 6, the wireless transceiver 7, the communication circuit 8, the estimator 9, the controller 10 and the non-volatile memory 12 may preferably be implemented using digital circuits. Alternatively, or additionally, one or more portions of these components may be implemented as analog circuits. Functional blocks of digital circuits may be implemented in hardware, firmware or software, or any combination hereof. Digital circuits may perform the functions of multiple functional blocks in parallel and/or in interleaved sequence, and functional blocks may be distributed in any suitable way among multiple hardware components, such as e.g. signal processors, microcontrollers and other integrated circuits.

The detailed description given herein and the specific examples indicating preferred embodiments of the invention are intended to enable a person skilled in the art to practice the invention and should thus be seen mainly as an illustration of the invention. The person skilled in the art will be able to readily contemplate further applications of the present invention as well as advantageous changes and modifications from this description without deviating from the scope of the invention. Any such changes or modifications mentioned herein are meant to be non-limiting for the scope of the invention.

The invention is not limited to the embodiments disclosed herein, and the invention may be embodied in other ways within the subject-matter defined in the following claims. As an example, features of the described embodiments may be combined arbitrarily, e.g. to adapt the apparatus or the method according to the invention to specific requirements.

Any reference numerals and labels in the claims are intended to be non-limiting for their scope.

The invention claimed is:

1. A communication apparatus comprising:
   a battery interface for receiving electrical energy from a main battery to energize the communication apparatus;
   a battery monitor adapted to determine a status of the main battery;
   a detector adapted to detect main charging events, based on the determined status of the main battery, wherein a main charging event comprises a charging or a replacement of the main battery;
   a receiver adapted to receive an auxiliary status signal from a peripheral device external to the communication apparatus, wherein the auxiliary status signal indicates an auxiliary energy level of an auxiliary battery of the peripheral device;
   an estimator adapted to detect low-battery conditions, based on the indicated auxiliary energy level; and
   a controller adapted to provide a notification signal for a user interface to notify a user of the detected low-battery conditions;
   wherein:
   the estimator further is adapted to determine notification triggers, in response to the detected main charging events and in dependence on the detected low-battery conditions; and
   the controller further is adapted to provide the notification signal in response to the determined notification triggers,
   characterized in that:
   the estimator further is adapted to maintain battery data indicating the latest auxiliary energy level received from the peripheral device and/or the latest determined presence or absence of a low-battery condition for the peripheral device, and to determine the presence or absence of a low-battery condition, based on the battery data when the peripheral device is not connected to the communication apparatus; and
   the controller further is adapted to provide the notification signal when the peripheral device is not connected to the communication apparatus.

2. A communication apparatus according to claim 1, further comprising a non-volatile memory and wherein the estimator further is adapted to:
   write battery data indicating detected low-battery conditions to the non-volatile memory; and
   determine the notification triggers, based on the battery data in the non-volatile memory.

3. A communication apparatus according to claim 2, wherein the estimator further is adapted to:
- detect auxiliary charging events, based on the indicated auxiliary energy level, wherein an auxiliary charging event comprises a charging or a replacement of an auxiliary battery of the peripheral device; and
- detect low-battery conditions, based on the detected auxiliary charging events.

4. A communication apparatus according to claim 3, wherein the estimator further is adapted to:
- determine a main statistic measure to indicate an averaged frequency of main charging events, based on the determined status of the main battery;
- determine an auxiliary statistic measure to indicate an averaged frequency of auxiliary charging events, based on a series of detected auxiliary charging events;
- determine a charging-event ratio indicating a ratio of the determined averaged frequency of main charging events over the determined averaged frequency of auxiliary charging events;
- determine a main charging count indicating the number of main charging events detected since the latest detected auxiliary charging event; and
- detect low-battery conditions, based on comparison of the charging-event ratio and the main charging count.

5. A communication apparatus according to claim 4, wherein the estimator further is adapted to:
- predict a time of the first or second future occurrence of a main charging event;
- determine a main charging time, based on the predicted time of the first or second future occurrence of a main charging event;
- predict a time of the first future occurrence of a discharge of the peripheral device;
- determine an auxiliary charging time, based on the predicted time of the first future occurrence of a discharge of the peripheral device; and
- detect low-battery conditions, based on comparison of the main charging time and the auxiliary charging time.

6. A communication apparatus according to claim 5, further comprising a receptacle for accommodating a main battery such that the main battery may be replaced by a user of the communication apparatus.

7. A communication apparatus according to claim 6, further comprising a charging circuit adapted to convey electrical energy received from an energy source external to the communication apparatus to the battery interface for charging the main battery.

8. A communication apparatus according to claim 7, wherein:
- the battery monitor further is adapted to detect and indicate when the energy source is connected to the charging circuit and/or when energy is conveyed from the energy source to the battery interface; and
- the detector further is adapted to detect main charging events in dependence on indications of the energy source being connected to the charging circuit and/or energy being conveyed from the energy source to the battery interface.

9. A communication apparatus according to claim 8, wherein:
- the battery monitor further is adapted to determine a main energy level of a main battery connected to the battery interface; and
- the detector further is adapted to detect main charging events in dependence on increases of the determined main energy level.

10. A communication apparatus according to claim 9, wherein the receiver further is adapted to receive a first audio signal from the peripheral device.

11. A communication apparatus according to claim 10, further comprising a transmitter adapted to transmit a second audio signal to the peripheral device.

12. A communication apparatus according to claim 11, further configured as a mobile phone, a tablet computer or a laptop computer.

13. A method for controlling a communication apparatus, the method comprising:
- at a battery interface receiving electrical energy from a main battery to energize the communication apparatus;
- by a battery monitor determining a status of the main battery;
- by a detector detecting main charging events, based on the determined status of the main battery, wherein a main charging event comprises a charging or a replacement of the main battery;
- by a receiver receiving an auxiliary status signal from a peripheral device external to the communication apparatus, wherein the auxiliary status signal indicates an auxiliary energy level of an auxiliary battery of the peripheral device;
- by an estimator detecting low-battery conditions, based on the indicated auxiliary energy level;
- by a controller providing a notification signal for a user interface to notify a user of the detected low-battery conditions;
- by the estimator determining notification triggers, in response to the detected main charging events and in dependence on the detected low-battery conditions; and
- by the controller providing the notification signal in response to the determined notification triggers,
characterized in that the method further comprises:
- by the estimator maintaining battery data indicating the latest auxiliary energy level received from the peripheral device and/or the latest determined presence or absence of a low-battery condition for the peripheral device, and determining the presence or absence of a low-battery condition, based on the battery data when the peripheral device is not connected to the communication apparatus; and
- by the controller providing the notification signal when the peripheral device is not connected to the communication apparatus.

\* \* \* \* \*